United States Patent [19]
Laschet

[11] Patent Number: 5,222,283
[45] Date of Patent: Jun. 29, 1993

[54] MACHINE TOOL

[75] Inventor: Norbert A. Laschet, Mülheim/Ruhr, Fed. Rep. of Germany

[73] Assignee: Ferro Tools Inc., City of Industry, Calif.

[21] Appl. No.: 749,430

[22] Filed: Aug. 23, 1991

[51] Int. Cl.⁵ .............................................. B23B 21/00
[52] U.S. Cl. .................................... 29/27 C; 82/158
[58] Field of Search ................ 29/27 C, 26 R, 26 A; 408/88; 409/216, 211, 242, 230; 82/142, 147, 158, 159

[56] References Cited

U.S. PATENT DOCUMENTS

| | | | |
|---|---|---|---|
| 838,250 | 12/1906 | Hudlow | 409/216 X |
| 2,215,369 | 9/1940 | Gabriel | 29/26 R |
| 4,080,853 | 3/1978 | Goto | 82/120 |

FOREIGN PATENT DOCUMENTS

3526493 1/1987 Fed. Rep. of Germany ...... 409/230

*Primary Examiner*—Z. R. Bilinsky

[57] ABSTRACT

An improved combination mill-lathe type machine tool including a work piece carrier carrying an elongate work piece on a turning axis; an elongate rotatable cutting tool carrier with an inner end and rotatably carrying a cutting tool on a rotating axis; and, an adjustable device to move the cutting tool carrier and tool into working position relative to the work piece and to feed the tool longitudinally thereof; said device includes a compound table with a plate movable on a plane along axes parallel with and normal to said turning axis, a first L-shaped pivot mount with a base pivotally mounted on the plate on a first swivel axis normal to the plate and with a leg spaced radially from and parallel with said first swivel axis, a second L-shaped pivot mount with a first arm parallel with and rotatably carried by said leg on a second swivel axis that is normal to and intersects the first swivel axis, and, a second arm carrying the cutting tool carrier with its inner end disposed toward the point of intersection of the first and second swivel axes and with its rotating axis intersecting said point.

10 Claims, 5 Drawing Sheets

MACHINE TOOL

BACKGROUND OF THE INVENTION

The present invention has to do with a machine tool that combines certain features of lathes and mills. Prior art machine tools of the character referred to in the foregoing are characterized by elongate axially shiftable and rotatable work piece carriers that carry and rotate work pieces about turning axes and that feed the work pieces longitudinally of the turning axes into working relationship with rotating cutting tools (in the nature of fly cutters) that are carried by cutting tool carriers. When these noted prior art machine tools are operated, a piece of work is rotated and advanced longitudinally of a turning axis toward a cutting tool at predetermined rates. The cutting tool is rotated at a different and predetermined rate so that the cutting tool intermittently strikes the work piece at predetermined positions about its perimeter, as it is rotated and advanced to the cutting tool. Such machine tools are particularly suited to machine flats, various sizes and shapes of grooves, channels, gear teeth and the like on or in work pieces in an effective and efficient manner.

PRIOR ART

To the best of my knowledge and belief, the prior art machine tools of the general character referred to above that are most like the machine tool of the present invention, include work piece carriers that releasably hold elongate work pieces concentric with a horizontal turning axis. The work piece carriers have electric motors to rotate the work pieces at desired speed. The work piece carriers are carried atop compound tables that are motor driven and that operate to shift the work piece carriers longitudinally of the turning axes to advance or feed the work pieces longitudinally at desired speed. The compound tables are also shiftable laterally and at right angle to the turning axes to effect lateral adjustment of the work pieces relative to the turning axes. The above-noted prior art machines next include elongate cutting tool carriers positioned on elongate substantially horizontal rotating axes. The cutting tool carriers include motor-driven chucks, at inner or free ends thereof. Fly cutter type cutting tools are releasably carried by the chucks and are rotated about said rotating axis at desired speed. The cutting tool carriers are typically mounted to turn or swivel approximately 90° about a vertical first swivel axis so that the plane of rotation of the cutting tools can be positioned to be parallel with or normal to the turning axis of the machines and so that the cutting tools can be disposed to effectively cut, for example, longitudinally extending flats and grooves in the work pieces, or, for example, to cut circumferentially grooves and notches in the work pieces. The cutting tool carriers are also typically mounted for pivotal movement about horizontal second swivel axes that are normal to the first swivel axes and that project therefrom to extend through the rotating axes of the cutting tool carriers at points spaced substantial distances from the cutting tools, so that the height or radial position of the cutting tools relative to the work pieces can be adjusted and so that the cutting tool can be progressively advanced radially inward relative to the turning axes and into engagement with the rotating work pieces as machining progresses. Adjustment of the position of the cutting tool carriers about the first and second swivel axes also enables adjustment of the angular orientation of the cutting tools for most effective cutting.

In the prior art machine tools of the general character referred to above, the first vertical swivel axes are most often laterally or radially offset from the horizontal turning and feeding axes of the work pieces and the second horizontal swivel axes are spaced above or radially outward from the horizontal turning and feeding axes of the work pieces. Radial outward placement of the second swivel axes from the turning axes of the work pieces, from which swivel axes the cutting tools are radially spaced and about which axes the cutting tools are provited or swing, when moved radially relative to the turning axes, results in substantial displacement of the cutting tools relative the two swivel axes. That is, the rotating axes of the cutting tool carriers that intersect the second horizontal swivel axes extend and project radially from the second swivel axes and the cutting tools, at the ends thereof, are at the free ends of elongate lever arms. Swinging of the cutting tools about the second swivel axes swings the cutting tools toward and away from the work pieces in a manner that greatly limits the degree to which the cutting tool carriers and cutting tools can be effectively moved and adjusted relative to the work pieces and materially limits the work that the machine tools can perform.

OBJECTS AND FEATURES OF THE INVENTION

It is an object and a feature of the present invention to provide an improved machine tool of the general character referred to above that includes; a work piece carrier that releasably holds an elongate work piece on a predetermined turning axis and that has an electric motor that turns the work piece about the turning axis at a desired speed; an elongate cutting tool carrier with an elongate central rotating axis and including a chuck at an inner end thereof concentric with the rotating axis; a fly-cutter type cutting tool carried by the chuck with its turning plane concentric with the rotating axis; and, an adjusting device carrying the cutting tool carrier for swivel movement about right angularly related first and second swivel axes that intersect each other at a point on the turning axis about which the work piece turns, towards which the inner end of the cutting tool carrier is disposed and through which the rotating axis of the cutting tool carrier extends.

Another object and feature of the present invention is to provide an improved machine tool of the general character referred to above wherein the adjustable device carrying the cutting tool carrier operates to selectively move the cutting tool carrier and its related cutting tool radially inward and outward from the turning axis of the work piece.

It is another object and feature of the invention to provide an improved machine tool of the general character referred to above wherein the adjusting device includes a first L-shaped pivot mount having a base that is normal to, extends transverse and that is rotatable about the first swivel axis and a leg carried by the base that is spaced radially from and extends parallel with the first swivel axis and that is normal to and extends across the second swivel axis; a second L-shaped pivot mount with a first arm parallel with and rotatably carried by the leg of the first pivot mount concentric with the second swivel axis and that is normal to and intersects the first swivel axis, and, a second arm spaced radially from and parallel with the second swivel axis and carrying the cutting tool carrier with its rotating axis normal to the second swivel axis; the two swivel axes and the rotating axis intersect at a point within the space defined by the L-shaped mounts and through which the turning axis about which the work piece rotates extends. With the above relationship of parts universal pivoting and/or swinging of the cutting tool carried by the cutting tool carrier, about the noted intersecting point of the several axes is only limited by mechanical interferences between the parts of the machine tool when parts thereof are moved to extreme positions. Thus, the machine tool that I provide is extremely versatile and is capable of performing many metal-cutting procedures that the machine tools of the same class provided by the prior art cannot perform.

It is an object and feature of the invention to rotatably mount the base of the first L-shaped pivot mount atop the cross-sliding stage of a compound table for rotation of the first pivot mount about said first swivel axis; said compound table operates to effect movement of the cutting tool carrier and its related cutting tool radially inward toward and outward from the turning axis and the work piece and to effect movement of the cutting tool carrier and the cutting tool longitudinally of the turning axis and the work piece.

Finally, it is an object and a feature of the present invention to provide an electric motor and gear drive between the leg of the first L-shaped mount and the first arm of the second L-shaped mount; between the cross-slide stage of the compound table and the face of the first L-shaped mount; and, between adjacent movable stages of the compound table whereby automated movement and adjustment of the cutting tool carrier and the cutting tool relative to the work piece can be attained.

The foregoing and other objects and features of the invention will be apparent and will be fully understood from the following detailed description of one typical preferred form and embodiment of the invention throughout which description reference is made to the accompanying drawings.

DETAILED DESCRIPTION OF THE INVENTION

Figure 1:
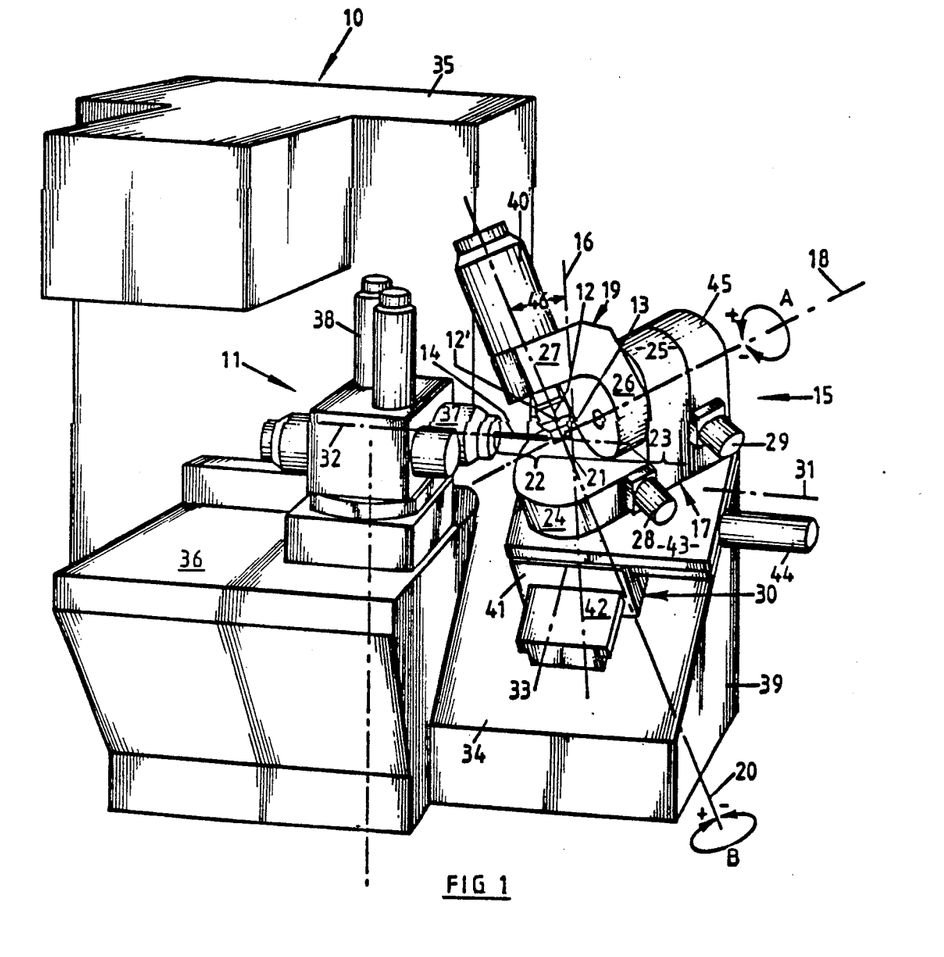
FIG. 1 is a perspective schematic view of a machine tool embodying the present invention; and, FIGS. 2 through 5 are enlarged views of the cutting tool carrier and adjusting device of the machine tool, showing parts in different positions.

The machine tool 10 schematically illustrated in FIG. 1 of the drawings includes a cabinet-like frame 35 defining a table 36 on which an elongate work piece carrier 11 is mounted. The carrier 11 has a chuck 37 at one end. The chuck holds an elongate work piece 14 (shown as a heavy line). The chuck 37 and work piece 14 are rotatably driven about an elongate turning axis 32 by an electric motor 38.

The machine tool 10 next includes a base table 39 defined by the frame 35 spaced longitudinally from said one end of the work piece carrier. The table 39 has an inclined top surface 34 that is shown to be inclined at about 35°. Supported atop the surface 34 of the table 39 is an adjusting device 15 for a tool carrier 12.

The tool carrier 12 is an elongate unit having inner and outer ends and has or is arranged concentric with an elongate rotating axis 20. The tool carrier 12 includes a motor 40 at its outer end and a chuck 12' at its inner end, driven by the motor.

The chuck 12' is shown holding a fly-cutter type cutting tool 13. The chuck 12' and cutting tool 13 are concentric with and rotate about the rotating axis 20. The radial turning plane of the cutting tool is concentric with the axis 20.

When the cutting tool 13 is in close working relationship with the work piece 14, it intermittently strikes the turning work piece. Depending upon the tool's shape and the dispositioning of its turning plane relative to the turning axis 32, slotted, grooved, serrated, polygonal, and various other shaped parts may be produced from the work piece 14, as the work piece is rotated about the turning axis 32 and as the rotating cutting tool 13 is fed (advanced) longitudinally of the work piece.

It is believed apparent and is to be understood that, in practice, cutting tools, other than fly-cutter type tools (such as conventional twist drills), may be used in my new machine tool, as circumstances require.

The adjusting device 15 includes a compound table 30 mounted atop the inclined surface 34 of the base table 39, as clearly shown in FIG. 1 of the drawings. The compound table 30 includes a top cross-slide stage or upper plate 43. The upper plate 43 is shiftably carried by an intermediate plate 41 for movement along a first adjusting axis 31 which extends parallel with the turning axis 32 of the work piece holder 11 and the work piece 14. The intermediate plate 41 is carried by a lower plate 42 for movement along a second adjusting axis 33 that is normal to the axis 31. The lower plate 42 is fastened to the inclined surface 34. The right angularly related axes 31 and 33 are parallel with the surface 34 of the table 39 and the plane of the upper plate 43.

The upper plate 43 is selectively moved back and forth along axis 31 by an electric motor 44 and a related worm gear drive (not shown) that is cooperatively related to the plates 43 and 41. The intermediate plate 41 can be and is preferably selectively moved back and forth along axis 33 by a similar motor and worm gear drive (not shown).

The compound table 30 shown and briefly described above is a standard machine tool device or subassembly, the basic nature and characteristics of which is well known to those who are skilled in the art. It will be apparent that the upper plate 43, and that which is carried by it, can be moved back and forth on the axes 31 and 33 to effect movement of the plate and that which is carried by it in any direction throughout the plane of the table.

It is to be noted that due to the inclination of the surface 34 and of the upper plate 43, upon movement of that plate along axis 33 the vertical position or placement of the plate 43 and that which is carried by it is varied. This movement of the plate can be utilized to effect certain vertical adjustments when the machine tool 10 is in use and operating.

The adjusting device 15, as shown in the drawings, next includes two L-shaped pivot mounts 17 and 19. The pivot mount 17 has a first arm or base 24 that is positioned adjacent to the upper plate 43 of the compound table 30 in parallel relationship therewith and is rotatably connected with the table for full rotation (360°) about a first vertical swivel axis 16 that is normal to and extends substantially upwardly from the table 30. The pivot mount 17 has a second arm or leg 25 extending upwardly from the base 24 and that is radially offset from and parallel with the swivel axis 16. The leg 25 of the first swivel mount 17 rotatably or pivotally supports the second pivot mount 19. The pivot mount 19 has a first arm 26 that is positioned adjacent to and parallel with the leg 25 of the pivot mount 17. The arm 26 is rotatably carried by the leg 25 on a second horizontal swivel axis 18.

Turning or swiveling of the pivot mount 19 about the swivel axis 18 is as extensive as the design of the machine tool permits. In the case illustrated, the pivot mount 19 can be turned well in excess of 180° about the swivel axis 18. In practice, by adjusting the dimensions of the leg and first arm of pivot mounts 17 and 19, the machine tool can be easily be made such that the pivot mount 19 can turn a full 360° about the swivel axis 18.

The swivel mount 19 has a second arm 27 that projects from its first arm 26 in radial spaced parallel relationship with the swivel axis 18. The second arm 27 of pivot mount 19 carries the cutting tool carrier 12 with the rotating axis 20 thereof normal to the swivel axis 18. The cutting tool carrier 12 is mounted and carried by the arm 27 of pivot mount 19 with the chuck 12', at its inner end, positioned between the arm 27 and the swivel axis 18 and with the motor 40, at its outer end projecting radially outward of the arm 27, with respect to the swivel axis 18.

The pivot mounts 17 and 19 are designed, constructed and related to each other so that the first and second swivel axes 16 and 18 intersect at point 21 that occurs in spaced relationship from and between the arms 26 and 27 and the base 24 and leg 25 of the pivot mounts 19 and 17, as clearly shown in the drawings. Further, the axis of rotation 20 of the cutting tool carrier 12 is normal to and extends or runs through intersecting point 21.

A special feature of the invention resides in the fact that the inner end of the cutting tool carrier 12, defined by the chuck 12', is directed toward the intersecting point 21. The distance between the inner end or chuck 12' of the cutting tool carrier 12 and the intersecting point 21 depends on practical requirements. For example, the radial extent of the work piece 14, about the turning axis 32, the length and/or diameter of the cutting tool 13 and/or the depth of cut to be made in the work piece are factors that determine the space between the inner end of the carrier 12 or chuck 12' and the intersecting point 21.

To effect turning or swiveling of the pivot mounts 17 and 19 about their swivel axes 16 and 18, I provide adjusting motors 28 and 29 that are engaged with angular gear drives (not shown) in driving engagement between the compound table 30 and base 24 of pivot mount 17 and between the leg 25 of pivot mount 17 and the arm 26 of pivot mount 19. The angular gear drives, which I have elected not to illustrate, can be any one of several gear drives that are commonly used in the art of machine tools to effect relative rotation of related parts, such as the pivot mounts in my new machine tool. For example, the angular gear drive provided to rotate the first pivot mount 17 about the first vertical swivel axis 16 can include an annular driven worm gear mounted on the upper plate 43 of the table 30, concentric with the first swivel axis 16 and, an elongate drive worm gear rotatably carried by the base of the pivot mount 17, engaging the annular driven gear and drivingly connected with the motor 28 that is mounted on and carried by the pivot mount 17. With such a relationship of parts, it will be apparent that when the motor 28 is caused to rotate, clockwise or counterclockwise, the pivot mount 17 is turned clockwise or counterclockwise relative to the table 30 and about the axis 16.

To effect turning or swiveling of the pivot mount 19, the first arm 26 of the pivot mount 19 is provided with an axle part that is concentric with the second horizontal swivel axis 18 and that projects through the leg 25 of the pivot mount 17 and into a gear box 45 mounted on and carried by the leg 25 of the pivot mount 17. An annular driven worm gear is mounted on the axle within the box 45. An elongate drive worm gear is rotatably carried by the box 45 and is in driving engagement with the annular driven worm gear. The drive worm gear is drivingly connected with the motor 29 that is mounted on and carried by the gear box 45. With the foregoing structure it will be apparent that when the motor 29 is caused to rotate clockwise or counterclockwise the pivot mount 19 is rotated or turned clockwise or counterclockwise about the horizontal swivel axis 18.

It will be apparent that the worm gear drives described above could be replaced with bevel gear drives, or the like, without departing from the broader aspects and spirit of my invention.

It is important to note that the motor 29 and gear drive for turning the pivot mount 19 are mounted on and carried within the box 45 on the leg 25 of pivot mount 17. Accordingly, the pivot mount 19 and the motor 29 and gear drive are effectively disassociated or separated from each other and so that the pivot mount 19 is relieved of the mass and bulk of the motor 29 and gear drive that might otherwise adversely affect accurately controlled turning or pivoting of the pivot mount 19.

The motors 28 and 29 are preferably stepping motors.

Figure 2:
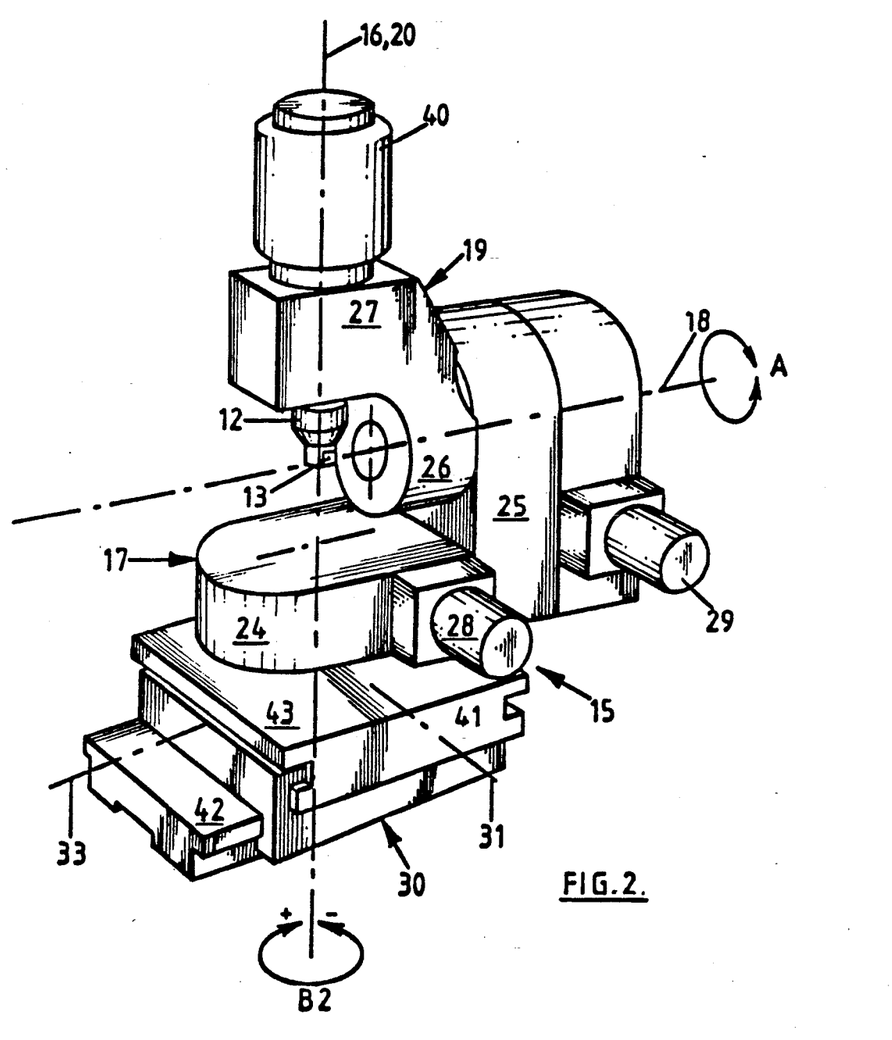
Figure 3:
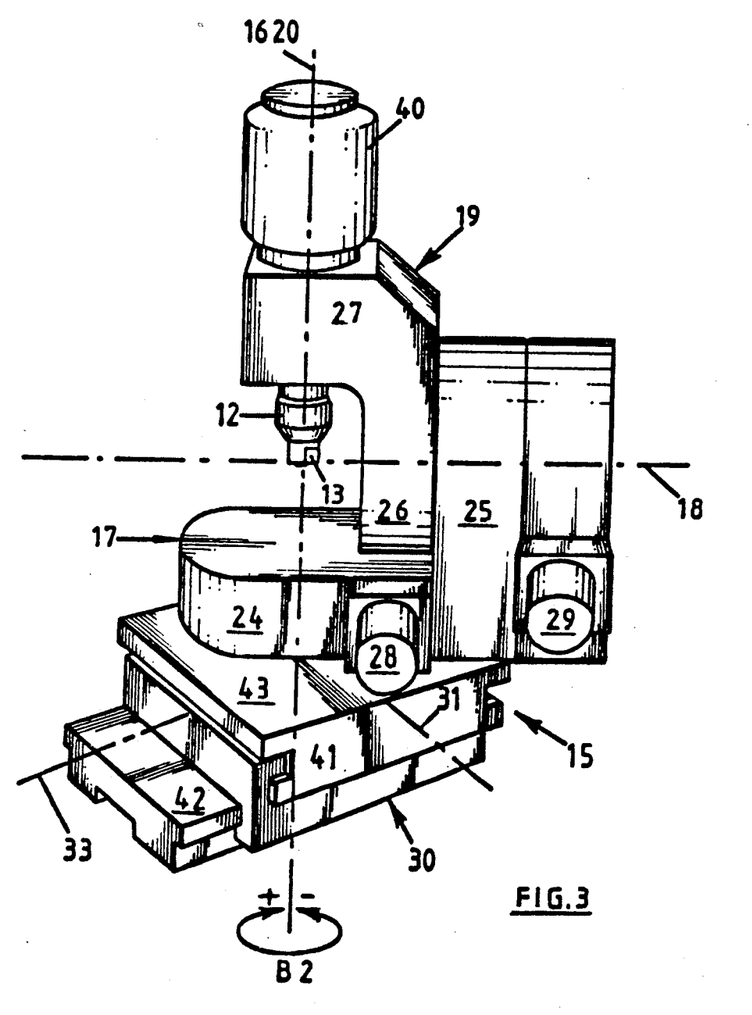
Figure 4:
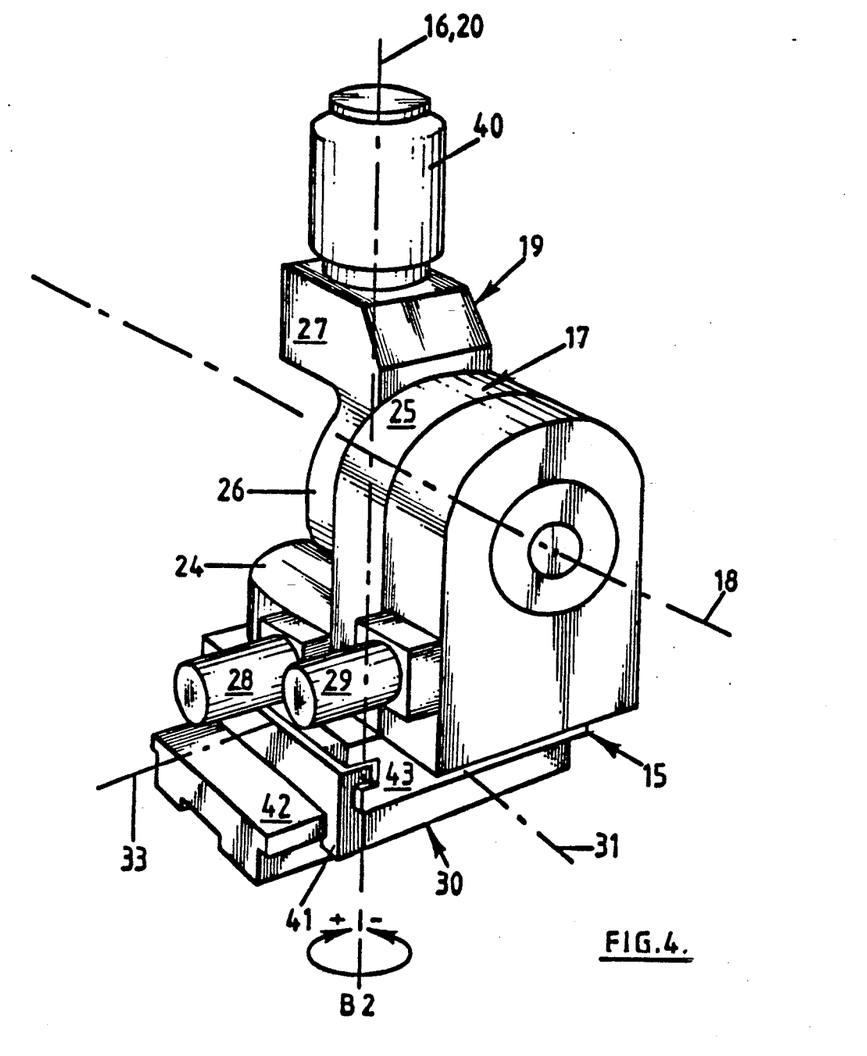

A comparison of FIGS. 2 through 5 of the drawings shows the wide range of movement and positioning of the cutting tool carrier 12 and its related cutting tool 13 that is afforded by my invention. FIGS. 2 through 4 of the drawings show the second pivot mount 19 positioned vertically relative to the compound table 30 so that the axis of rotation 20 of the cutting tool carrier 12 is coincidental with the first swivel axis 16 about which the base 24 of the pivot mount 12 rotates.

In FIGS. 2 through 4 of the drawings, the base 24 of pivot mount 17 is shown in three different rotative positions about the swivel axis 16 and relative to the compound table 30. In FIG. 2 of the drawings, the base 24 is positioned so that the second swivel axis 18 about which swivel mount 19 turns is parallel to the axis 33 of the bottom plate of the compound table 30. In FIG. 3 the base 24 is pivoted about 35°, while in FIG. 4 it is pivoted by about 90° about the swivel axis 20 (from the position shown in FIG. 1 of the drawings) so that the base 24 and the second swivel axis 18 are pointing in a direction that is angularly offset between the axes 31 and 33 of the table 30. It is apparent that in the form of the invention illustrated the base 24 and the axis 18 can be turned another 90° in the same direction, as shown in FIGS. 1 and 2 of the drawings, before it is stopped from further pivoting by interfering parts of the construction.

Figure 5:
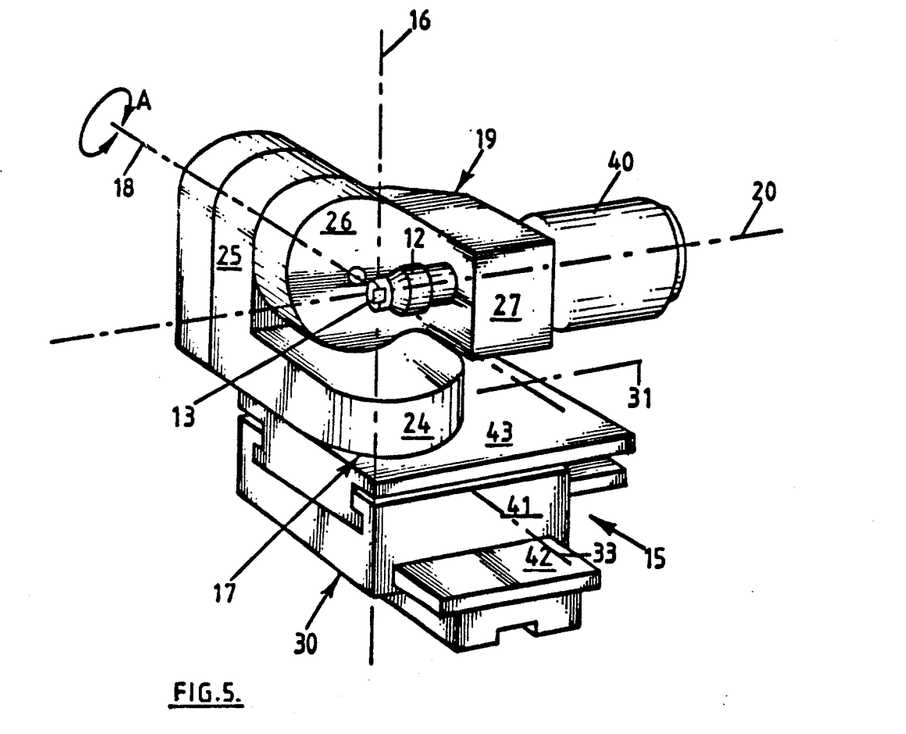

The pivoting or turning maneuverability of the arm 27 of pivot mount 19 and hence the pivoting or turning flexibility of the cutting tool carrier 12, can be seen by a comparison of FIG. 1 of the drawings with, for example, FIGS. 2 and 5 of the drawings. In FIGS. 1 and 3 of the drawings, the base 24 of pivot mount 17 is in the same position while in FIG. 1, pivot mount 19 is shown turned or tilted toward (in the direction of) the work piece carrier 11 so that the axis of rotation 20 of the cutting tool 12 is at that angle indicated by the arrows 46 between the axes lines 16 and 20 in FIG. 1 of the drawings. With the pivot mount 19 so tilted and the axis 20 of the cutting tool 12 so disposed, the inner end of the cutting tool carrier 12 defined by the chuck 12' is above the intersection point 21 and occurs or is positioned within the space or area, defined by the bracket 22 in FIG. 1 of the drawings, between the work piece carrier 11 and the first swivel axis 16. From this position and upon turning pivot mount 19 about axis 18 through its vertical position shown in FIG. 3 of the drawings and toward the position shown in FIG. 5 of the drawings, the pivot mount 19 is tilted away from the work piece carrier and the inner end of the cutting tool carrier 12 is positioned within an area, defined by the bracket 23 in FIG. 1 of the drawings, that occurs at the opposite side of the axis 16 from the work piece carrier 11. Movement of the carrier in the manner set forth in the foregoing changes the radial turning plane of the cutting tool 13 to enable the machine to make many different cuts in the work piece without the necessity of changing cutting tools.

In FIGS. 2 and 5 of the drawings (which views the structure from different sides) the compound table 30 and the pivot mount 17 are in the same position. In FIG. 2 the pivot mount 19 is in a vertical, central or intermediate position, while in FIG. 5 the pivot mount 19 is turned clockwise 90° to a horizontal position. The pivot mount 19 can just as readily be turned 90° in a counter-clockwise direction from the position shown in FIG. 2. Accordingly, it is apparent that in the case of the machine tool illustrated, the pivot mount 19 and the axis of rotation 20 of the cutting tool carrier 12 can be turned at least 180° about the pivot axis 18 and the intersecting point 21. It is also apparent that by making minor dimensional changes, such as lengthening the leg 25 and the arm 26 of the pivot mounts 17 and 19, the turning range of the pivot mount can be extended to 360°, should such extended turning range be desired.

When the pivot mount 17 is rotated 90°, about the axis 16 from the position shown in FIG. 2 of the drawings to the position shown in FIG. 4 of the drawings, where its base 24 extends parallel to the axis of rotation 32 of the work piece carrier 14 (while the table 30 is positioned as shown in FIG. 1 of the drawings) the pivot mount 19 can be pivoted 180° to a horizontal position, such as is shown in FIG. 5 of the drawings, where it is at the right side of the base and the axis of rotation 32 to a horizontal position where it is at the left side of the base 24 and the axis of rotation 32.

It can be seen from the foregoing that cutting tool carrier 12 and its related cutting tool 13, when spaced from the intersecting point 21 of swivel axes 16 and 18, can be pivoted throughout more than one-quarter of a spherical surface, the center point (hub) of which is coincidental with intersection point 21.

An important feature of the machine tool here provided resides in the fact that the adjusting device 15, made up of the compound table 30 and the pivot mounts 17 and 19, together with the cutting tool carrier, is a neat and compact assembly of parts wherein the swivel or pivot axes 16 and 18 and the rotating axis 20 are directed toward and converge or intersect at the intersection point 21 that is located within the assembly of parts. As a result, easy, quick and accurate adjusting of the relative positioning of the parts is assured. That is, the parts need not be moved great distances and pivoted or made to swing through wide or extensive arcs to attain major adjustments. Further, the noted novel relationship of parts affords a strong and stable structure wherein the forces that are encountered are most advantageously and favorably resolved.

It will be apparent that the new and improved machine tool that I provide affords a greater degree of pivotal movement and adjustment of the positioning of the cutting tool carrier and its related cutting tool relative to and about a related work piece than is provided by machine tools of similar kind that are provided by the prior art and therefore enables the machine tool to perform machining operations that cannot be performed as effectively and efficiently by prior art machine tools. By moving and adjusting the position of the cutting tool carrier in a programmed manner during a single machining operation, the machine tool of the present invention can produce many machined parts, the production of which would require two or more separate machining operations if made with those prior art machine tools of which I am aware.

Having described only one typical preferred form and embodiment of my invention, I do not wish to be limited to the specific details herein set forth but wish to reserve to myself any modifications and/or variations that might appear to those who are skilled in the art or which fall within the scope of the following claims.

Having described my Invention, I claim:

1. A machine tool including a work piece carrier carrying an elongate work piece for rotation about a longitudinally extending turning axis; an elongate motor-driven cutting tool carrier with inner and outer ends in working position relative to the work piece and rotatably carrying a cutting tool at its inner end for rotation about a rotating axis; a device carrying the cutting tool carrier to move the position of the cutting tool carrier and the cutting tool relative to the work piece during operation and use of the machine tool, said device includes a first pivot mount rotatably mounted in radial spaced relationship from said longitudinal turning axis for rotation about a first swivel axis parallel with a radial plane through said longitudinal turning axis, a second pivot mount rotatably carried by the first pivot mount for rotation about a second swivel axis that is normal to and intersects the first swivel axis, said second pivot mount carries the cutting tool carrier with its inner end disposed toward and with its axis of rotation extending through the point of intersection of the first and second swivel axes.

2. The machine tool set forth in claim 1 wherein the first and second pivot mounts are rotatable about the first and second swivel axes to move the cutting tool carrier between positions where its inner end and cutting tool carried thereby are positioned in the area that occurs between the first swivel axis and the work piece carrier and a position where the first swivel axis occurs between the work piece carrier and the inner end of the cutting tool carrier and the cutting tool.

3. The machine tool set forth in claim 1 wherein the first and second pivot mounts are movable about the first and second swivel axes to selectively position the inner end of the cutting tool carrier and the cutting tool at opposite sides of the turning axes, selectively change the angular relationship of the turning and rotating axes and selectively change the position of the rotating axis radially from the turning axis.

4. The machine tool set forth in claim 1 wherein the first pivot mount is an L-shaped part with an elongate base that is normal to the first swivel axis and parallel to the second swivel axis and an elongate leg that is parallel with the first swivel axis, said second swivel mount is an L-shaped part with a first elongate arm that is parallel with and is rotatably mounted on the leg of the first pivot mount concentric with the second swivel axis, the second pivot mount has a second elongate arm that is spaced radially from and extends parallel with the second swivel axis and that carries said cutting tool carrier with its rotating axis normal to the second swivel axis.

5. The machine tool set forth in claim 1 wherein the second pivot mount is an L-shaped part with right angularly related first and second elongate arms, the first arm is spaced radially from and parallel with the first swivel axis, the second arm is spaced radially from and parallel with the second swivel axis, said cutting tool carrier is carried by the second arm and is positioned with its axis of rotation through and parallel with a radial plane through the second swivel axis that is parallel with and through which the first swivel axis extends normal to the second arm and in spaced parallel relationship with the first arm.

6. The machine tool set forth in claim 1 wherein the first pivot mount pivots 360° about the first swivel axis and the second pivot mount pivots at least 180° about the second swivel axis.

7. The machine tool set forth in claim 1 wherein each pivot mount has an angular gear drive with an electric drive motor connected with it that is selectively operable to turn it clockwise and counterclockwise about its related swivel axis.

8. The machine tool set forth in claim 7 wherein the electric motor and parts of the gear drive for the second pivot mount are mounted on and carried by the first pivot mount.

9. The machine tool set forth in claim 1 wherein said device includes a compound table with an upper plate that is movable on axes parallel with and normal to the turning axis of the work piece carrier, the first pivot mount is rotatably mounted on said upper plate for rotation about said first swivel axis, said first swivel axis is normal to the plane on which the upper plate moves.

10. The machine tool set forth in claim 9 wherein the compound table is inclined between horizontal and vertical planes and disposes the adjusting device, cutting tool carrier and cutting tool for ready and convenient viewing and access.

* * * * *